March 17, 1931. G. FOERSTNER 1,796,363
INNER TUBE BUILDING METHOD AND APPARATUS
Filed April 13, 1929
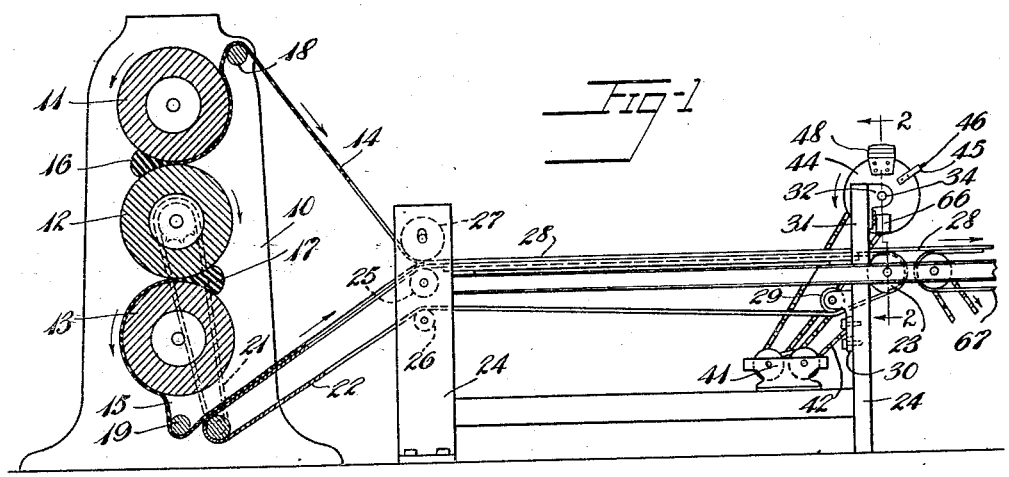
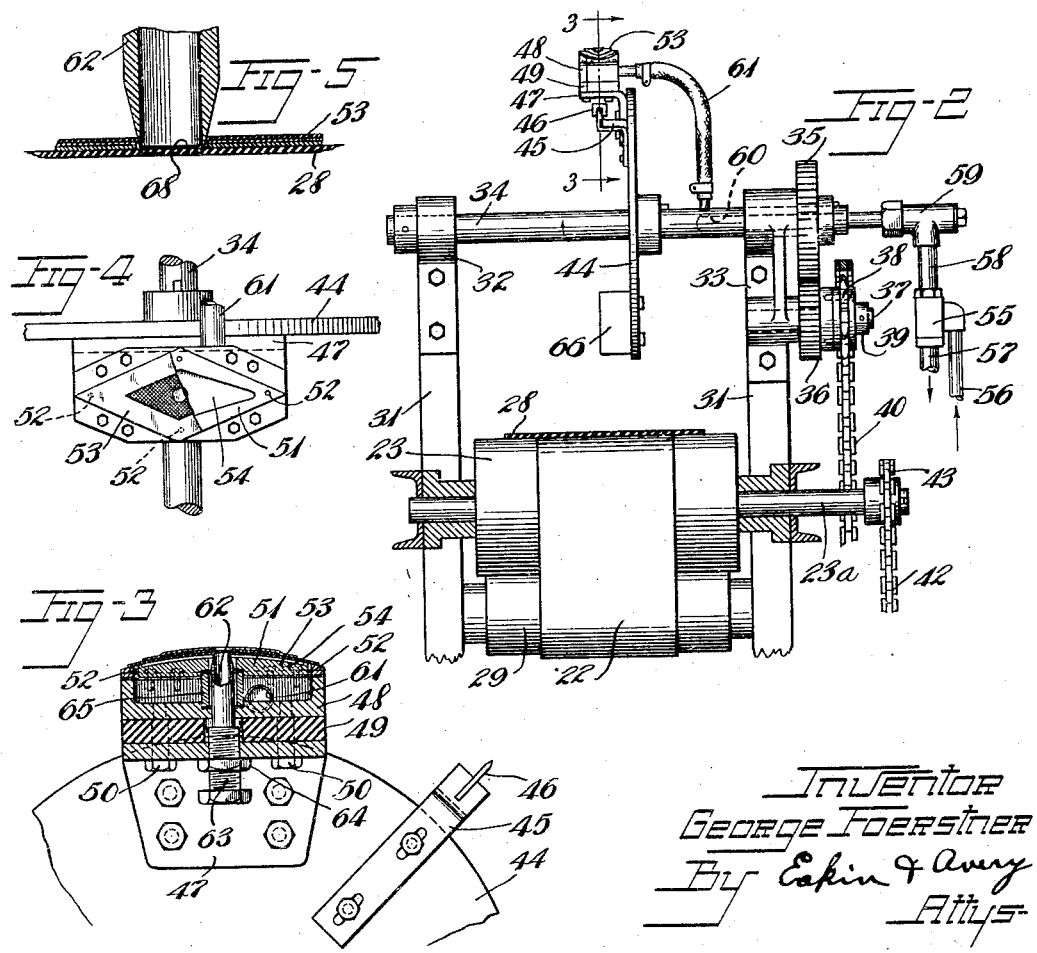
Inventor
George Foerstner
By Eakin & Avery
Attys Patented Mar. 17, 1931

1,796,363

UNITED STATES PATENT OFFICE

GEORGE FOERSTNER, OF AKRON, OHIO, ASSIGNOR TO THE B. F. GOODRICH COMPANY, OF NEW YORK, N. Y., A CORPORATION OF NEW YORK

INNER-TUBE-BUILDING METHOD AND APPARATUS

Application filed April 13, 1929. Serial No. 354,844.

This invention relates to inner tube building methods and apparatus, and more especially to procedure and apparatus for mounting a valve pad upon a strip of unvulcanized tube-building material during the manufacture of the latter into an inner tube for a pneumatic tire casing. The valve pad comprises a laminated structure, usually polygonal in shape, consisting of one or more plies of rubberized fabric having a valve stem aperture therethrough, and a ply of thin unvulcanized rubber of the same general shape but larger in size adhered to one face of the fabric structure and covering the aperture therein.

The application of a succession of the valve pads to a continuous strip of sheet rubber heretofore has been effected in the prevailing practice by mechanically impressing a guide-mark in the continuous strip, manually applying the valve pad upon the guide-mark in a manner to confine the fabric plies of the pad between its rubber ply and the continuous strip, and then manually punching the rubber from the valve aperture. Because of the manual operations involved, inaccuracies in the positioning of the valve pad and in the punching of the hole therein have been of frequent occurrence.

The chief objects of this invention are to attain more accurate positioning of a valve pad on a strip of inner tube stock; to provide more accurate positioning of the valve hole in the pad and in the tube stock; to provide apparatus for successively applying valve pads to sheet material and concurrently cutting valve holes therein; and to provide for economy of labor in the manufacture of inner tubes.

Of the accompanying drawings:

Fig. 1 is a side elevation of apparatus embodying and adapted to carry out my invention in its preferred form, a part thereof being in section.

Fig. 2 is a section on line 2—2 of Fig. 1 on a larger scale, parts thereof being in elevation.

Fig. 3 is a section on line 3—3 of Fig. 2.

Fig. 4 is a plan view of a valve pad support, and a valve pad thereon, the latter being partly broken away.

Fig. 5 is fragmentary sectional detail of a punch in operative association with the work.

Referring to the drawings, 10 is one end frame of a three-roll calender of known design, and 11, 12, 13 are interconnected driven rolls therein adapted to be driven by any known or suitable means (not shown). The rolls are adapted to form sheets or strips of rubber 14, 15 from respective banks of unvulcanized rubber 16, 17 fed into the bights of the rolls 11, 12 and 12, 13 respectively. Respective guide-rollers 18, 19 are journaled in the calender frames 10 adjacent the calender rolls 11, 13 to facilitate the removal of the strips 14, 15 therefrom.

Journaled in the calender-frames 10 at the delivery side thereof adjacent the guide-roller 19 is a belt-pulley 20 driven by a sprocket chain 21 from the hub of the calender roll 12. The pulley 20 supports one end of an endless conveyor belt 22 which conveys the strips 14, 15 from the calender, the other end of the conveyor being mounted upon a pulley 23 which is mounted upon a shaft 23ª journaled in a framework 24 at some distance from the calender and at a higher level than the pulley 20. At the end of the framework 24 nearest the calender the upper and lower reaches of the conveyor 22 are supported upon respective idler sheaves 25, 26 journaled in said framework, the sheave 25 being on the same level as the pulley 23. A floating presser roll 27 is journaled in the framework 24 above the sheave 25 and is adapted to press together the strips 14, 15 as the same are delivered from the calender 10 and brought together on the conveyor 22 to form a composite two-ply strip 28. A tightening-roller 29 is journaled in adjustably mounted brackets such as the bracket 30 on the framework 24, for keeping the conveyor 22 in taut condition. Preferably the pulley 23 is centrally grooved as shown in Fig. 2 to receive the conveyor belt 22 and prevent lateral movement of the belt with relation to its pulleys.

Extending upwardly from opposite sides of the framework 24 adjacent the pulley 23 are framework extensions 31, 31, and mounted upon the front and rear extensions respectively are journal brackets 32, 33 in which is journaled a rotatable shaft 34 positioned parallel to and directly above the pulley 23. The rear end portion of the shaft 34 is provided with a gear 35 meshed with a gear 36 journaled upon a stub-shaft 37 secured in the journal bracket 33, and a gear 36 has a laterally extending hub portion upon which is mounted a sprocket 38, said gear 36 being retained in its stub-shaft by a collar 39 mounted on the end thereof. The sprocket 38 is connected by a sprocket chain 40 to one side of a variable speed device 41, and the other side of the latter is connected by a sprocket chain 42 to a sprocket 43 mounted upon the shaft 23$^a$ of the pulley 23.

Mounted upon the shaft 34 is a large disc 44 and secured to the front face thereof is a radial arm 45 which extends beyond the periphery of the disc and has its end portion provided with a flat plate 46 disposed transversely with relation to the strip of material 28 on the conveyor 22. The position of the disc 44 axially of the shaft 34 and the length of the arm 45 is such that the outer edge of the plate 46 will engage the strip 28 near the middle thereof and momentarily bear thereagainst during each revolution of the shaft 34. The device impresses a mark upon the strip 28 which mark is visible on the opposite face thereof and serves to indicate where the strip is to be severed after it has been formed into a tubular structure in the manufacture of inner tubes. The variable speed device 41 interposed in the driving connection between the shaft 34 and the shaft 23$^a$ makes possible the adjustment of the relative speeds of said shafts so that the intervals between successive contacts of the plate 46 with the strip 28 may be varied to alter the distance between the marks impressed thereon.

Mounted upon the disc 44 near the arm 45 is an angular bracket 47 upon which is mounted a hollow box-like structure 48, a cushion of resilient material 49 such as rubber being interposed between the box 48 and bracket 47. The box 48 is attached to the bracket 47 by bolts 50, 50 which pass freely through the bracket and permit relative movement of the box with relation thereto in a radial direction. The box 48 is provided on its outer side with an arcuate cover 51 concentric with the shaft 34 and said cover is formed with four apertures 52, 52 which are so positioned as to be overlain by the respective corner portions of a valve pad 53 when the latter is mounted upon the arcuate face of the box during the operation of the apparatus. The outer face of the cover 51 is formed with a recess 54 substantially of the shape of the fabric plies of the valve pad 53 and of the same depth as the thickness of said plies, the arrangement being such that substantially uniform pressure will be applied to all portions of the valve pad when it is pressed onto the strip 28.

For holding the valve pad 53 upon the cover 51 of the box 48 by suction prior to its application to the strip 28, an ejector 55 having the usual pressure inlet pipe 56, pressure outlet pipe 57 and suction pipe 58 is connected through the suction pipe, with an angular fixture 59 swiveled in the end of the shaft 34 and communicating with an axial bore 60 therein. A flexible pipe 61 connects the bore 60 with the interior of the hollow box 48, the arrangement being such that suction established in the ejector 55 is applied through the apertures 52 to the valve pad 53 to hold the latter to the cover 52 of the box 48.

For accurately positioning the valve pad 53 upon the suction box cover 51 and for punching out the rubber of its rubber ply overlying the central aperture in its fabric plies, I provide a tubular punch 62 formed with a threaded shank 63 and a hexagon head, said shank being threaded through the angular portion of the bracket 47 on which the suction box 48 is mounted, and secured in adjusted position therein by a lock nut 64. The punch 62 extends through suitable apertures in the cushion 49, box 48, and box-cover 52, and has its sharpened end portion extending somewhat beyond the outer face of the latter, the cushion 49 back of the suction box 48 permitting limited relative axial movement of the punch 62 and suction box. A sleeve 65 surrounds the punch 62 in the chamber of the box 48, said sleeve being set into the bottom of the box and into the cover 52 so as to seal said chamber from the respective apertures in the box and cover through which the punch extends.

A counterweight 66 is mounted upon the disc 44, diametrically opposite the suction box, for balancing the disc.

A conveyor 67 aligned with the conveyor 22 at the delivery end of the latter is provided for conveying the strip 28 to other stations where succeeding operations are performed thereon.

In the operation of the apparatus a continuous strip of unvulcanized rubber 28 is formed on the calender and delivered onto the conveyor 22 which feeds it longitudinally and delivers it onto the conveyor 67. Driving of the conveyor 22 also drives the rotatable disc 44, at determinate relative speed, and pressure fluid is passed through the ejector 55 at all times the apparatus is in operation, to maintain suction within the suction box 48. As the latter moves in its annular orbit, an operator applies a valve pad 53 to its outer face and accurately positions the pad thereon by aligning the aperture in the pad with the end of the punch 62 which projects from the face of the suction box. The valve pad is mounted with its rubber ply next to the surface of the suction box, and said ply being of plastic unvulcanized material, the punch is easily located therethrough at the valve aperture. Suction through the apertures 52 in the suction box holds the valve pad accurately in position as the orbital movement of the suction box carries it downwardly and into engagement with the moving strip of material 28.

The valve pad 53 is carried into rolling engagement with the tacky, unvulcanized strip 28 over the belt-pulley 23 around which the conveyor 22 passes, the belt pulley providing an unyielding support for the strip 28 while the valve pad is pressed thereupon, yieldingly by reason of the cushion 49 back of the suction box 48. The bracket 47 supporting the latter is so mounted and arranged with relation to the conveyor 22 that the punch 62 fixedly mounted in said bracket is forced through the rubber ply covering the valve aperture of the valve pad 53 and pressed substantially through the rubber strip 28, the suction box retracting against its cushion 49. A rubber disc 68, Fig. 5, cut from the valve pad by the punch, is pressed thereby against the strip 28 and adhered thereto by the punch as the latter incises said strip. The pressure of the suction box causes the valve pad 53 to adhere to the tacky strip 28 with sufficient tenacity to break the suction holding the pad to the suction box as continued orbital movement of the latter carries it out of engagement with the strip 28, the relative movement being such as to strip the valve pad from the suction box progressively at their leading ends.

The plate 46, upon engagement with the strip 28, impresses a mark therein which serves as a guide for the subsequent severing of the strip into individual lengths suitable for the manufacture of inner tubes. This completes one cycle of operation of the apparatus, for the application of one valve pad to the strip, and the operation described may be repeated in a continuous succession of cycles for the application of successive valve pads.

The strip 28 is so deeply cut by the punch 62 that a valve stem is easily pushed through the valve pad aperture, thereby completing the separation of the rubber of the strip 28 lying thereover, and ejecting it, with the disc 68 adhering to it. The arrangement by which the disc 68 is adhered to the strip 28 and the latter only partly severed by the punch 62 obviates the necessity of an ejector for the punch.

The apparatus is economically operated by one operator and provides the several advantages set out in the statement of objects.

The invention may be modified within the scope of the appended claims, and I do not limit my claims wholly to the exact procedure or specific construction shown and described.

I claim:

1. In apparatus for building inner tubes, the combination of means for feeding a continuous strip of tube-building material, a support adapted to hold valve pads on its surface against the force of gravity, and means for applying said support with a valve pad thereon at periodic intervals to the strip of tube-building material adhesively to attach the valve pads thereto.

2. Apparatus as defined in claim 1 in which the support is adapted to hold the valve pads thereon by suction.

3. In apparatus for building inner tubes, the combination of means for feeding a continuous strip of tube-building material, a valve pad support having orbital movement in one region of which it engages the strip of material, to apply a valve pad thereto, and means for holding a valve pad on said support.

4. Apparatus as defined in claim 3 in which the support is adapted to hold a valve pad thereon by suction.

5. In apparatus for making inner tubes, the combination of means for feeding a continuous strip of tube-building material, a valve pad support constructed and arranged for periodic movement to press successive valve pads onto said strip, and means on said support registerable with the valve apertures of the successive valve pads for accurately positioning the latter on said support.

6. Apparatus as defined in claim 5, in which the valve-pad positioning means comprises a punch.

7. In apparatus for making inner tubes, the combination of means for feeding a continuous strip of tube-building material, a valve pad support constructed and arranged for periodic movement to press successive valve pads onto said strip, suction means for holding a valve pad on said support, and a punch registerable with the valve aperture in the fabric plies of the valve pad for positioning the latter on said support.

8. In apparatus for making inner tubes, the combination of means for feeding a continuous strip of tube-building material, a rotary member adjacent thereto, a valve pad support mounted on said rotary member and adapted in one region of its orbit to press a valve pad thereon against the strip of material as it is fed, and means for driving the rotary member at determinate speed with relation to the feed of the material.

9. Apparatus as defined in claim 8 including a yielding seat for the valve pad support.

10. In apparatus for making inner tubes, the combination of means for feeding a continuous strip of tube-building material, a valve-pad support, means for moving the same in an orbit in one region of which it presses a valve pad against the strip of material, means for creating suction within the valve-pad support to retain a valve pad thereon, and a yielding seat for the valve-pad support.

11. In apparatus for making inner tubes, the combination of means for feeding a continuous strip of tube-building material, a valve-pad support, means for causing the latter periodically to approach the strip of material to apply valve pads thereto, and a punch associated with said valve-pad support and so mounted and arranged as to be movable with relation thereto.

12. Apparatus as defined in claim 11 in which the valve-pad support is yieldingly mounted with relation to the punch.

13. In apparatus for making inner tubes, the combination of means for feeding a continuous strip of tube-building material, a valve-pad support, means for causing the latter periodically to approach the strip of material to apply valve pads theerto, and a punch associated with said support and adapted to die out material from the valve pad and adhesively attach said material to the continuous strip of material.

14. Apparatus as defined in claim 13 in which the punch is so mounted as deeply to cut but not completely to sever a piece from the continuous strip of material.

15. In apparatus for making inner tubes, the combination of means for feeding a continuous strip of tube-building material, a valve-pad support, means for moving said support in an orbit in one region of which it approaches the strip of material to apply a valve-pad thereto, suction means for retaining a valve-pad on said support, a yielding seat for said valve-pad support, and a punch associated with the valve-pad support.

In witness whereof I have hereunto set my hand this 9th day of April, 1929.

GEORGE FOERSTNER.